US012576998B2

(12) United States Patent
Kirkland et al.

(10) Patent No.: US 12,576,998 B2
(45) Date of Patent: Mar. 17, 2026

(54) DISTRIBUTED DRIVE SYSTEMS AND METHODS OF USE THEREOF

(71) Applicant: Redwire Space, Inc., Jacksonville, FL (US)

(72) Inventors: William Brandon Kirkland, St. Augustine, FL (US); Michael Snyder, Jacksonville, FL (US)

(73) Assignee: Redwire Space, Inc., Jacksonville, FL (US)

( * ) Notice: Subject to any disclaimer, the term of this patent is extended or adjusted under 35 U.S.C. 154(b) by 868 days.

(21) Appl. No.: 17/850,810

(22) Filed: Jun. 27, 2022

(65) Prior Publication Data

US 2023/0026825 A1     Jan. 26, 2023

Related U.S. Application Data

(60) Provisional application No. 63/221,094, filed on Jul. 13, 2021.

(51) Int. Cl.
| | |
|---|---|
| *B64U 50/19* | (2023.01) |
| *B62D 55/08* | (2006.01) |
| *H02K 3/04* | (2006.01) |
| *H02K 11/30* | (2016.01) |
| *B65G 23/23* | (2006.01) |

(52) U.S. Cl.
CPC ............. *B64U 50/19* (2023.01); *B62D 55/08* (2013.01); *H02K 3/04* (2013.01); *H02K 11/30* (2016.01); *B65G 23/23* (2013.01)

(58) Field of Classification Search
CPC . H22K 3/04; H22K 11/30; H22K 7/14; H22K 21/14; H22K 21/22; H22K 41/031; B64U 50/19; B62D 55/08; B65G 23/23; B65G 54/02
See application file for complete search history.

(56) References Cited

U.S. PATENT DOCUMENTS

| | | | | |
|---|---|---|---|---|
| 11,289,988 | B2 * | 3/2022 | Hayward | H02K 33/16 |
| 2021/0112964 | A1 * | 4/2021 | Schaefer | A61C 17/16 |
| 2022/0227183 | A1 * | 7/2022 | Haronian | B60C 11/243 |
| 2022/0397486 | A1 * | 12/2022 | Decoster | G01B 7/10 |

* cited by examiner

*Primary Examiner* — Emily P Pham
(74) *Attorney, Agent, or Firm* — Terry M. Sanks, Esq.; Beusse Sanks, PLLC

(57) ABSTRACT

The present disclosure provides distributed drive systems and methods of use thereof. A distributed drive system may comprise one or more coils, one or more magnets, and at least one tread. A method for a distributed drive system may comprise the utilization of a plurality of voltage phases. The coils may comprise conductive wiring wrapped in a pre-defined form. In some embodiments, the coils may alternate in polarity. In some implementations, the coils may be attached directly to the frame of a larger machine or vehicle for uniform heat distribution. The magnets may comprise composite materials with ferrous portions. When the system comprises at least one tread, magnets may be embedded within the tread. In some aspects, the distributed drive system may be contained within a motive system of a machine or vehicle, thereby limiting the need for a transmission between a power source and the motive components of the machine or vehicle.

20 Claims, 8 Drawing Sheets

230

235

220

210

230

220

300

340

500

500

740

700

800

DISTRIBUTED DRIVE SYSTEMS AND METHODS OF USE THEREOF

CROSS-REFERENCE TO RELATED APPLICATION

This application claims priority to and the full benefit of U.S. Provisional Patent Application Ser. Nos. 63/221,094 (filed Jul. 13, 2021, and titled "DISTRIBUTED DRIVE SYSTEMS AND METHODS OF USE THEREOF"), the entire contents of which are incorporated herein by reference.

BACKGROUND

Traditional drive systems generally refer to any configuration of components that directly contributes to moving an object, such as a vehicle or other machine. Drive systems may comprise various forms depending on the type of associated vehicle. Drive systems for nearly any ambulatory application include an engine or motor coupled with power dividing units ("PDUs") or transmissions to deliver power and torque to wheels, treads, or similar mechanical elements. A drive system may also include a drive shaft, a differential, and an axle.

Motors and engines may be considered a 'point source' of heat generation. Terrestrially, this requires cooling and radiators. Cooling removes excess heat from the engine, allowing it to operate at a temperature where it works most efficiently. Coolers and radiators help bring an engine or motor to the right operating temperature as quickly as possible and maintain the optimal operating temperature. When an engine is cold, this causes the engine to operate a bit differently, causing a decrease in performance. Engines are designed to warm up quickly to maximize efficiency.

Air flow is important for managing heat in a drive system. If coolant within the drive system is incredibly hot, the engine depends on a radiator to stabilize its temperature, since the radiator typically draws hot coolant away from the engine. If there is enough air flow through the radiator, the engine can stay cool. However, if the air flow rate is low, the radiator won't be able to stabilize the temperature, causing the engine to overheat.

In lunar or other extraterrestrial applications, thermal problems associated with engines and drive systems are amplified. Without natural air flow within the environment, any overheating issues are exacerbated within the vehicle. This is further complicated by the fact that there is no natural thermal generation in lunar or many other extraterrestrial environments. In these environments, there is an increased need to properly control both heat generation as well as heat dissipation.

In addition to thermal problems, there is also a loss of power and an introduced complexity in vehicular motive systems when the power produced by a motor or alternative power source needs to be transferred to the motive system of a vehicle. Traditional systems utilize a transmission to transfer this power from a motor to a drive shaft, but this often comes at the expense of power lost via gear displacement and friction.

Additionally, a vehicle may become susceptible to contaminants that may interfere with power transference and reduce the mobile capacity of the vehicle. The transmission connections to the drive shaft and subsequently to the wheels often contain portions of the system that are open to the atmosphere. This allows contaminants and particles to enter and become integrated into various portions of the motive system and reduce mobile capacity of the system over time. Clearly, efficiency and power would be increased if there was a method of providing rotational energy to the wheels directly that minimizes the risk of contaminant exposure.

Regardless of the environment, there could be an issue where dust or dirt can enter and disrupt the gears or drivetrain of a system. Additionally, there is always a risk of particulate contamination, even in a clean room, from a belt conveyor system or where something might get caught on moving parts.

SUMMARY OF THE DISCLOSURE

What is needed are systems and methods for distributing heat evenly and providing power to a wheel system without a transmission within a vehicle. In some embodiments, a system in accordance with the present disclosure may comprise a distribution of one or more motor coils over the full frame of a tread and/or its associated vehicle or rover. Thus, heat generation may no longer be concentrated to a small volume and heat may be sunk to structural elements where it may be simple to reject via radiation or convection (depending on environmental applications). Additionally, space or extraterrestrial applications of robots and rovers that frequently require heaters on sensors and functional elements on the far extremities thereof may benefit from this embodiment of motor integration, which may help distribute thermals throughout the vehicle, possibly reducing the need for additional heaters.

The present disclosure provides for distributed drive systems and methods of use thereof. A distributed drive system may comprise one or more coils, one or more magnets, and at least one tread. A method for a distributed drive system may comprise the utilization of a plurality of voltage phases. The coils may comprise conductive wiring wrapped in a predefined form. In some embodiments, the coils may alternate in polarity. In some implementations, the coils may be attached directly to the frame of a larger machine or vehicle for uniform heat distribution. The magnets may comprise composite materials with ferrous portions. When the system comprises at least one tread, magnets may be at least partially embedded within the tread. In some aspects, the distributed drive system may be contained within the motive system of a machine or vehicle, thereby eliminating the need for a transmission between a power source and the motive components of the machine or vehicle.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

Figure 1A:
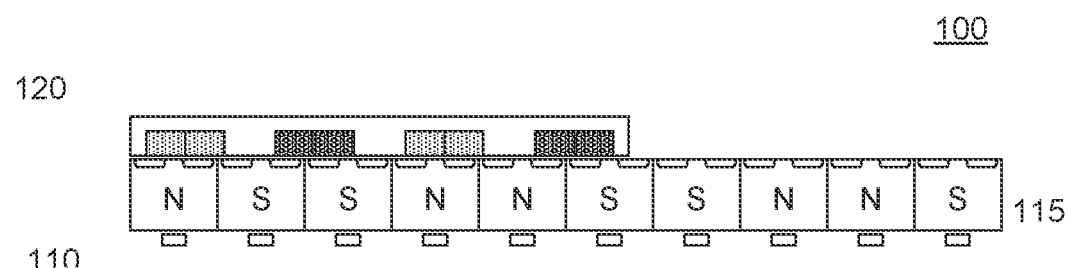
FIG. 1A illustrates a phase signal propagation of an exemplary distributed drive system, according to some embodiments in the disclosure.
Figure 1B:
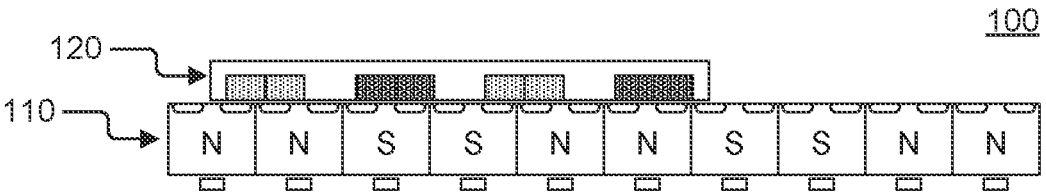
FIG. 1B illustrates a phase signal propagation of an exemplary distributed drive system, according to some embodiments in the disclosure.
Figure 1C:
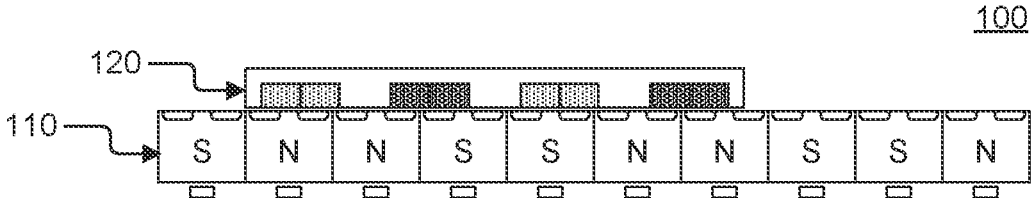
FIG. 1C illustrates a phase signal propagation of an exemplary distributed drive system, according to some embodiments in the disclosure.
Figure 1D:
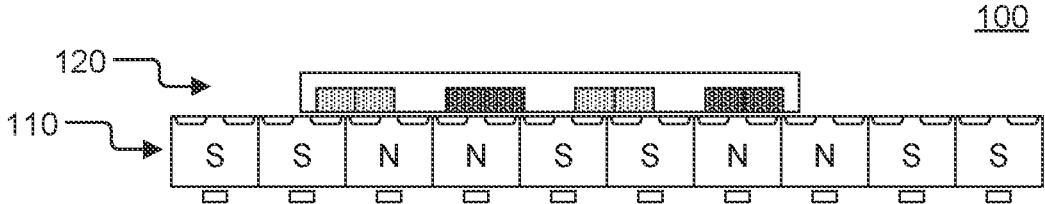
FIG. 1D illustrates a phase signal propagation of an exemplary distributed drive system, according to some embodiments in the disclosure.

The present disclosure provides generally for distributed drive systems and their respective methods of use. According to the present disclosure, a distributed drive system may comprise one or more coils, one or more magnets, and at least one tread. In some embodiments, a distributed drive system may interface with a larger machine that undergoes directional movement via the distributed drive system.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Tread: as used herein refers to an external plurality of surfaces that perpetuate an intended direction of motion. In some embodiments, the tread may comprise a belt-based motive apparatus similar to a tank tread that propels a vehicle forward. In some implementations, the tread may comprise at least one wheel that rotates upon applied external force. In some aspects, the tread may be used to move a plurality of separate objects similar to a conveyor belt in an industrial factory, as a non-limiting example.

Coil: as used herein refers to at least one electromagnetic coil. In some embodiments, coils may comprise solenoid coils or laminated core wound electromagnets of any geometry. In some implementations, each coil may generate an alternating or oscillating magnetic field.

The present disclosure describes distributed drive systems and their methods of use. A distributed drive system may comprise one or more coils, one or more magnets, and at least one tread. In some embodiments, a distributed drive system may interface with a larger machine that undergoes directional movement via the distributed drive system.

Referring now to FIGS. 1A-D, a phase signal propagation of an exemplary distributed drive system 100 is illustrated. In some embodiments, the distributed drive system 100 may comprise at least one coil 110. In some implementations, the distributed drive system may comprise a plurality of coils 110. In some aspects, the coils 110 may comprise one or more polarities 115. In some embodiments, each coil 110 may comprise a laminated core wound with one or more electromagnets. In some implementations, each coil 110 may be activated in a predetermined alternating sequence to produce an alternating or oscillating magnetic field configured to interact with one or more magnets 120. In some aspects, the alternating sequence of the magnetic field may occur in multiple phase patterns.

As an illustrative example, when two-phase voltages of the coils 110 has completed one full cycle, the resultant magnetic field may have rotated 360°. By placing two coils 110 at right angles to each other and exciting these windings with voltages 90° out of phase, a rotating magnetic field may result. This coil 110 orientation may enable the rotating magnetic field to initiate rotational motion in a circular wheel. Distributing the coils 110 throughout the intended range of motion may provide sufficient magnetism to facilitate continual rotational movement of the magnets 120.

As another illustrative example, when the two-phase voltages of the coils 110 have completed one full cycle, the resultant magnetic field may result in horizontal translation. By using a predetermined alternating sequence to activate and alternate the polarity 115 of adjacent coils 110 in a linear order, magnets 120 attracted to a specific polarity 115 may positionally shift as the polarity 115 is altered. The stationary magnets 120 may be at least partially embedded in at least one tread that moves with the shifting magnets. The resultant force may propel a lunar rover forward that is connected to the tread, as a non-limiting example.

In some embodiments, the alternating sequence of the magnetic field may occur in phase patterns comprising three or more phases, wherein each phase may comprise two or more voltage phase sequences. In some aspects, as the number of phases in a pattern increases, the number of sequences that each phase comprises may also increase. In some implementations, a greater number of sequences may allow for increasingly minute control of motion. In some aspects, at least one control panel may facilitate a transfer between phase sequences. As an illustrative example, a lunar rover may operate via a two-phase voltage pattern to cover large distances and then the lunar rover may switch to a four-phase voltage pattern to navigate coarse terrain, wherein large movement from a tread may risk overturning the lunar rover.

In some implementations, the distributed drive system 100 may comprise one or more magnets 120 fixed to a movable element. In some aspects, the magnets 120 may directly interface with the various structural elements of a machine. This structural interface may reduce point source heat generation by distributing generated heat across the frame of the machine. In some embodiments, the distributed heat generation may replace traditional heating systems used for portions of the machine.

As an illustrative example, a Mars rover may possess a tread for mobility that at least partially comprises one or more fixed magnets 120 on an interior portion of the tread. One or more coils 110 may be configured externally from the tread and may be distributed across the length of the tread and attached to the frame of the Mars rover. When powered, the coils 110 may generate heat that provides sufficient temperature to the Mars rover that allows for the proper functionality of one or more sensors that may be integrated with the rover that may otherwise require one or more separate heaters. The Mars rover may comprise sufficient insulation to retain a sufficient amount of heat for the sensor(s) or other devices associated with the rover when the Mars rover is stationary.

Figure 2A:
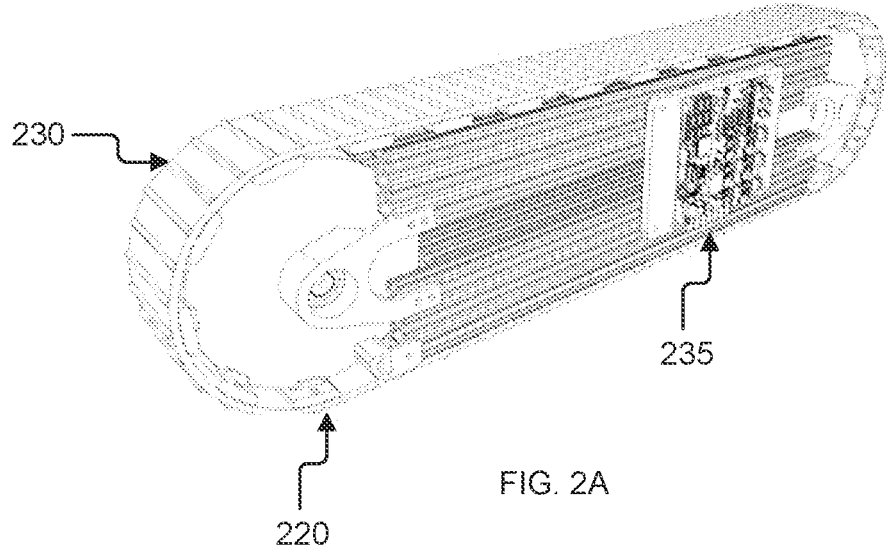
FIG. 2A illustrates an exemplary distributed drive system, according to some embodiments in the disclosure.
Figure 2B:
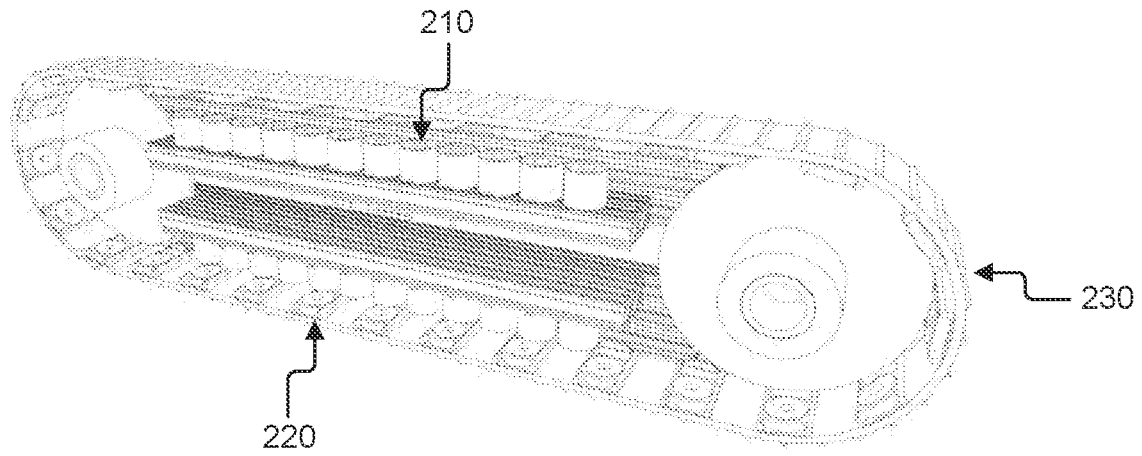
FIG. 2B illustrates an exemplary distributed drive system, according to some embodiments in the disclosure.

Referring now to FIGS. 2A-B, an exemplary distributed drive system 200 is illustrated. In some embodiments, the distributed drive system 200 may comprise at least one coil 210. In some aspects, the distributed drive system may comprise a plurality of coils 210. In some implementations, the distributed drive system 200 may comprise one or more fixed magnets 220. In some embodiments, the magnets 220 may enclose the coils 210. The enclosure of the coils 210 may allow the magnets to rotate around the coils 210 in response to shifts in the polarity of the coils 210.

In some implementations, the magnets 220 may be connected to or at least partially contained within at least one tread 230. In some aspects, the tread may enclose the coils 210 and magnets 220. In some embodiments, the timing of voltage applied to the coils 210 from at least one power supply may comprise a plurality of phases that may be controlled by at least one external control panel 235. In some implementations, the control panel 235 may regulate power received from the at least one power supply by distributing power to the coils 210 at predetermined intervals. In some aspects, the control panel 235 may store programming instructions or code and may comprise one or more software interfaces with other sensors within or otherwise associated with an interfaced machine that allow the control panel 235 to anticipate required changes in the current voltage distribution and timing. These anticipatory measures and the receiving of input from two or more sensors may reduce hysteresis in remotely controlled distributed drive systems 200.

In some implementations, the distributed drive system 200 may replace the need for a transmission in conventional motive systems. Due to the coils 210, magnets 220, and control panel 235 existing within the tread 230, the distributed drive system 200 may provide translational motion without externally applied torque or force. Reducing the number of traditional components required for translational motion may reduce the weight of the interfaced machine. The reduced weight may be critical in applications, such as, but not limited to, space/extraterrestrial environments, where weight is a critical attribute of design and performance.

In some aspects, the distributed drive system 200 may remain completely enclosed. The enclosed aspect of the distributed drive system 200 may reduce the introduction of contaminants and particles into the distributed drive system 200 that may contribute to a shortened life cycle of internal components and lead to reduced efficiency of the distributed drive system 200 over time, as non-limiting attributes.

The enclosed aspect may allow the distributed drive system 200 to operate in particle-constrained environments. For example, the distributed drive system 200 may provide rotational motion to a conveyor belt in a clean room, where particles in the air may affect the performance of silicon chips manufactured in the clean room.

As another example, the distributed drive system 200 may provide power to treads of a remote-controlled rover that is driving through dusty and sandy environments, and the enclosed aspect of the distributed drive system 200 may enable the rover to traverse the terrain with protection from particles that may otherwise inhibit the treads of the rover.

Figures 3A, 3B:
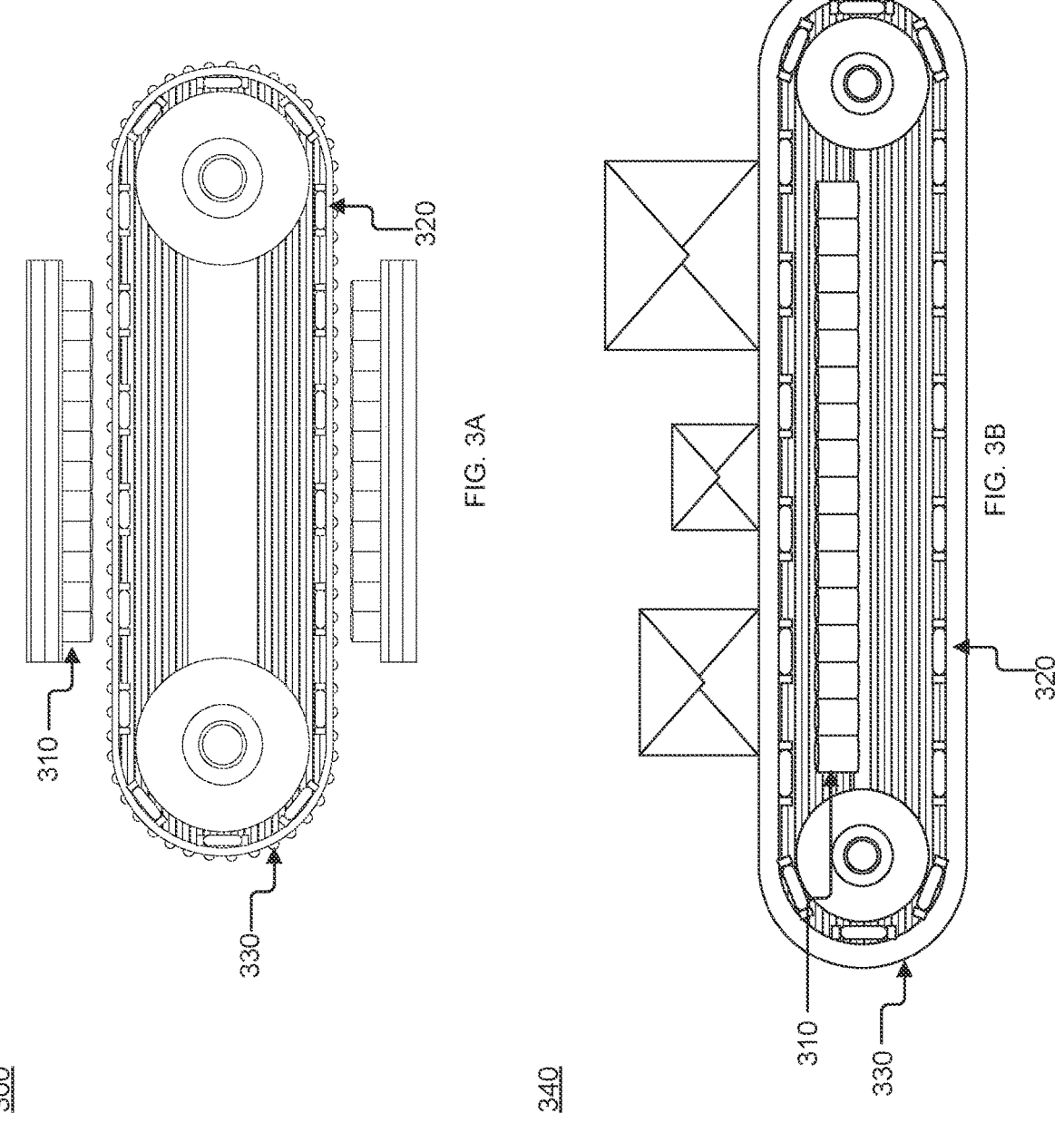
FIG. 3A illustrates an exemplary distributed drive system, according to some embodiments in the disclosure.
FIG. 3B illustrates an exemplary distributed drive system, according to some embodiments in the disclosure.

Referring now to FIG. 3, an exemplary distributed drive system 300 is illustrated. In some embodiments, the distributed drive system 300 may comprise at least one coil 310. In some aspects, the distributed drive system may comprise a plurality of coils 310. In some implementations, the distributed drive system 300 may comprise one or more fixed magnets 320. In some embodiments, the coils 310 may be configured externally from the magnets 320. In some aspects, the magnets 320 may be connected to or at least partially contained within at least one tread 330.

In some embodiments, the external coils 310 may induce an electromagnetic field that facilitates directional motion in an interfaced machine. This orientation of the coils 310 may provide a predetermined path of motion for the interfaced machine while allowing the tread 330 comprising the magnets 320 to be replaceable.

As an illustrative example, a manufacturing facility may comprise two or more production lines. Predefined routes of product movement within the warehouse may be facilitated by coils 310 embedded along those paths. The manufacturing facility may use the tread 330 to power various conveyor belts that are product specific. As consumer demands change, the manufacturing facility may change which products are serviced in different regions of the warehouse. The conveyor belts specific to those products may be interchanged while retaining the integrity of the product line conveyor belt pathways using the fixed coils 310. The retention of the pathways may be useful for manufacturing facilities that consistently produce the same products using the same manufacturing processes in high quantities.

In some implementations, the coils 310 may be enclosed by the magnets 320. In some aspects, this may provide a portability aspect that allows all components required for directional movement to be retained within the distributed drive system 300. Elaborating from the previous manufacturing facility example, this configuration may allow the manufacturing facility to alter the orientation and configuration of the product lines. Retaining the coils 310 within the conveyor belt may be useful for lean manufacturing facilities when products are developed in small quantities for short amounts of time. The shortened production cycle would necessitate a frequent restructuring of the warehouse layout to adapt to new products with differing manufacturing processes.

Figure 4:
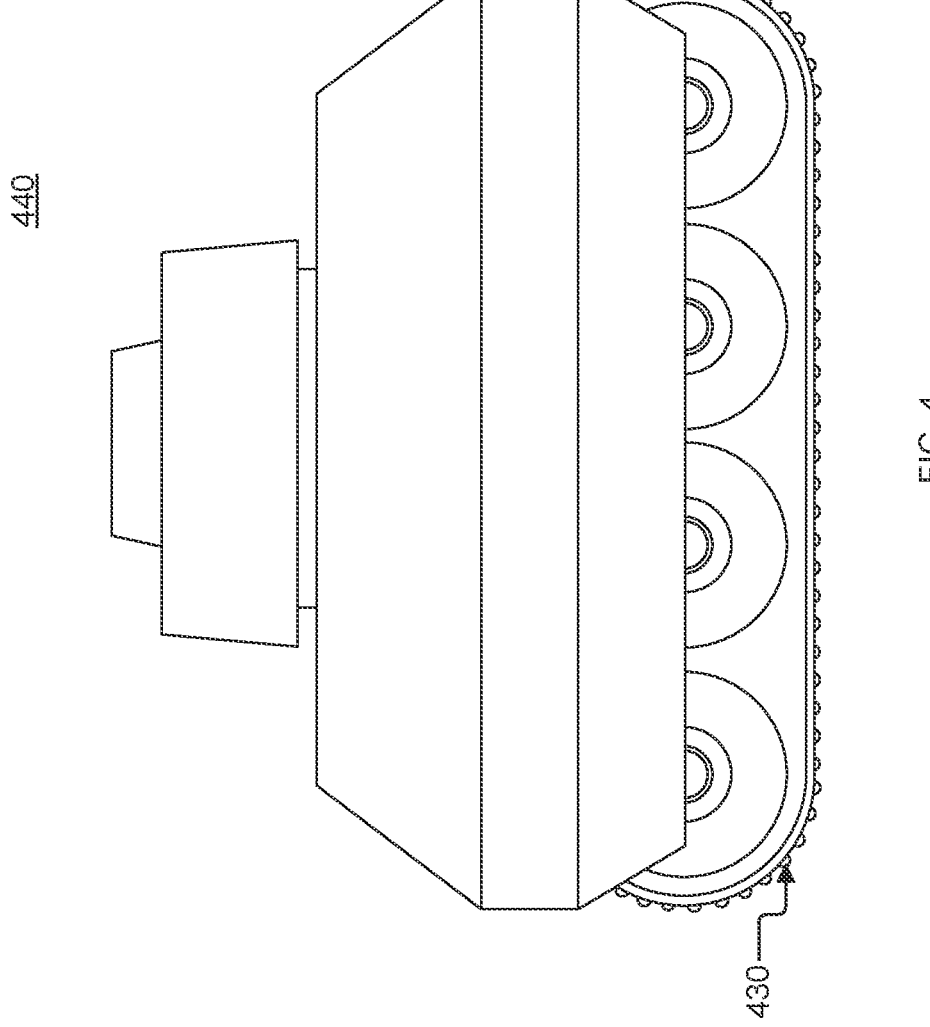
FIG. 4 illustrates a vehicle comprising an exemplary distributed drive system, according to some embodiments in the disclosure.

Referring now to FIG. 4, a vehicle 440 comprising an exemplary distributed drive system is illustrated. In some aspects, one or more magnets may be connected to or at least partially contained within at least one tread 430. In some embodiments, the distributive drive system may provide directional motion to an interfaced machine, such as vehicle 440. In some implementations, the distributive drive system may be scaled for larger vehicles 440 with sufficient power supply. As an illustrative example, an all-terrain rover may use the distributed drive system while drawing power from an internal power source.

In some aspects, one or more coils within the vehicle 440 may be configured to form a plurality of shapes. The coils may continuously produce an intended electromagnetic field with sufficient voltage in a plurality of orientations. As an example, the tread 430 of the vehicle 440 in the form of a rover may comprise coils that are secured to the frame of the rover along the entire elongated shape of the tread 430. As another example, the coils may line the circular interior of a medical centrifuge.

Figure 5A:
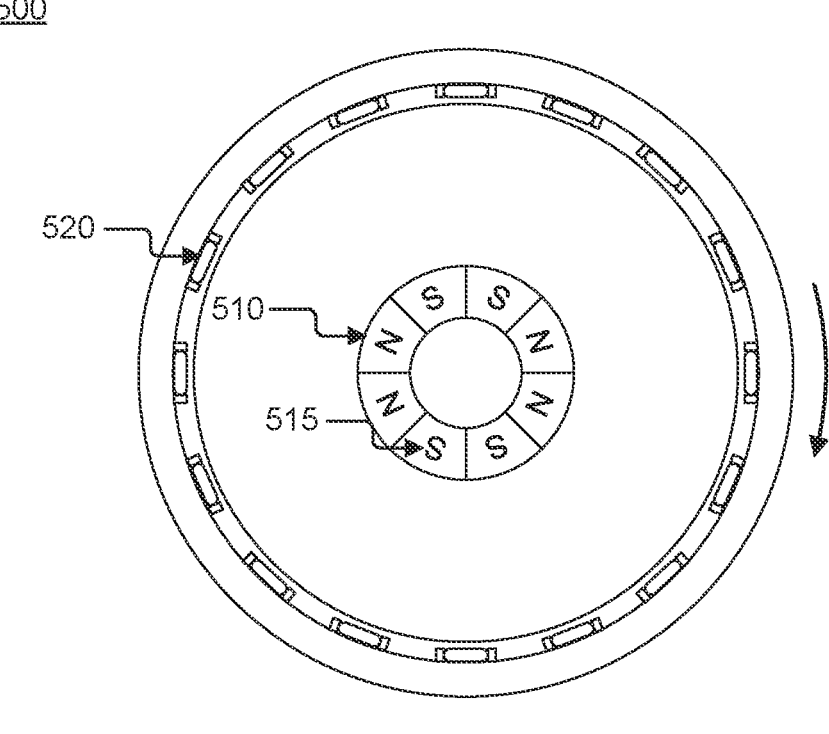
FIG. 5A illustrates an exemplary distributed drive system, according to some embodiments in the disclosure.
Figure 5B:
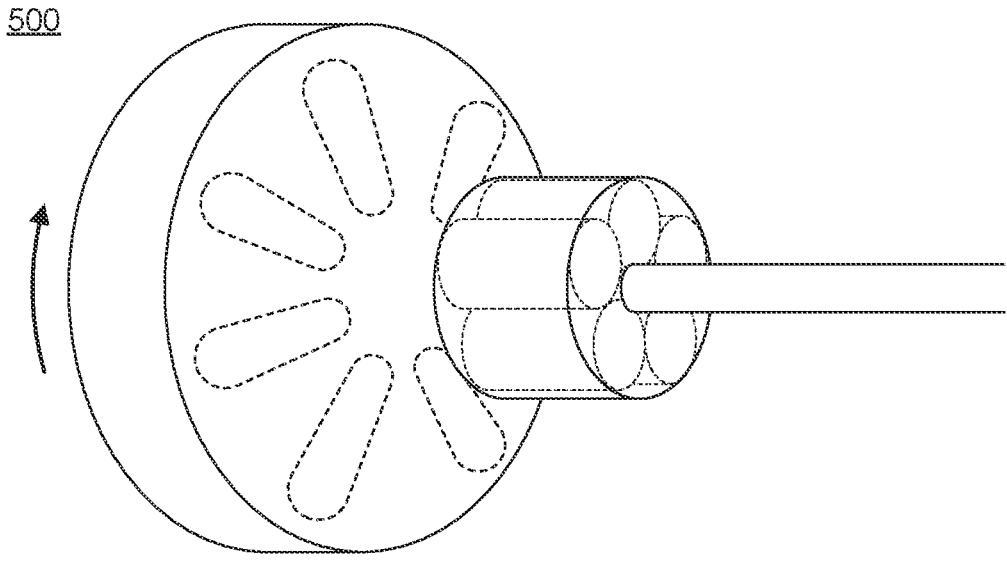
FIG. 5B illustrates an exemplary distributed drive system, according to some embodiments in the disclosure.

Referring now to FIGS. 5A-B, an exemplary distributed drive system 500 is illustrated. In some embodiments, the distributed drive system 500 may comprise at least one coil 510. In some implementations, the distributed drive system may comprise a plurality of coils 510. In some aspects, each of the coils 510 may comprise one or more polarities 515. In some embodiments, the distributed drive system 500 may comprise one or more fixed magnets 520.

In some aspects, the coils 510 and the magnets 520 may reside in separate components. In some embodiments, the coils 510 may receive power and produce a magnetic field sufficient to induce movement from the magnets 520 when the coils 510 approach a predetermined alterable proximity to the magnets 520, thereby allowing the magnets 520 to be influenced by the force exerted by the magnetic field. In some implementations, altering the distance between the coils 510 and the magnets 520 may alter the amount of force exerted on the magnets 520 by the magnetic field. The separation of the coils 510 and the magnets 520 may be helpful in applications where intermittent movement at a variable speed is desired. The separation of the components may help reduce wear in an external interfaced machine.

The separate nature of the coils 510 and the magnets 520 may allow for rotational manipulation of objects independent of the distributed drive system 500. As an example, satellite components may be assembled autonomously in space, wherein the coil(s) 510 may manipulate the orientation of satellite components embedded with one or more magnets 520. This may be more cost effective than fuel-based external manipulation of minor parts of a larger assembly. Different components of the satellite assembly may comprise magnets 520 of differing polarity to allow for the manipulation of the orientation of the components by the distributed drive system 500 that may subsequently use the differing polarities to fit together using the same magnetism.

In some embodiments, the coil(s) 510 of a distributed drive system 500 may be introduced to one or more magnets 520 to reduce rotational motion. As an illustrative example, the flywheel of a stationary bike may comprise ferrous metal portions spaced evenly throughout the flywheel. Electromagnetic coils 510 may activate to create a directional force opposite the current direction of rotation. This opposing force may operate as resistance for the cyclist that increases by increasing the proximity of the coils 510 to the flywheel. Similarly, the coils 510 may act as brakes to magnets 520 currently in motion by reversing the polarity and phase sequence of the coils 510.

In some aspects, the magnets 520 of a distributed drive system 500 may exist as a composite single component. As an example, a non-ferrous metal may comprise ferrous metals distributed at predetermined intervals within the non-ferrous metal. The embedded ferrous metal may allow the non-ferrous metal to be manipulated by the magnetic field induced by one or more coils 510 similar to external magnets 520 that might be attached to the non-ferrous metal.

Figure 6A:
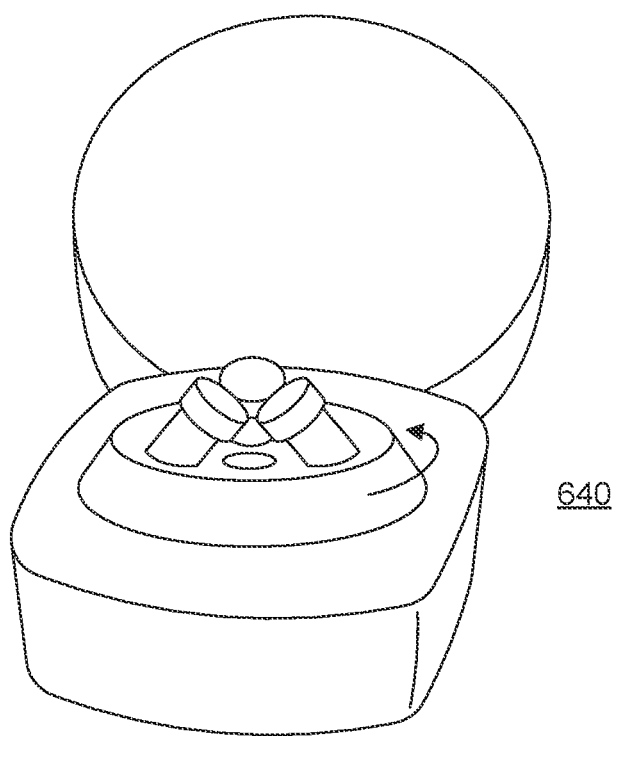
FIG. 6A illustrates an exemplary application of an exemplary distributed drive system, according to some embodiments in the disclosure.
Figure 6B:
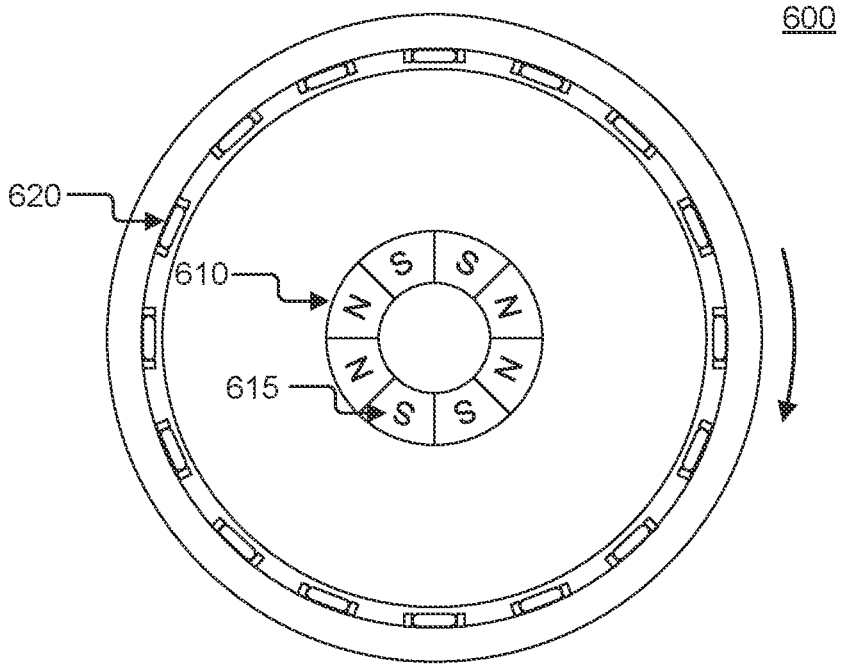
FIG. 6B illustrates an exemplary distributed drive system, according to some embodiments in the disclosure.

Referring now to FIGS. 6A-B, an exemplary distributed drive system 600 and an exemplary application thereof are illustrated. In some embodiments, the distributed drive system 600 may comprise at least one coil 610. In some implementations, the distributed drive system 600 may comprise a plurality of coils 610. In some aspects, each of the coils 610 may comprise one or more polarities 615. In some embodiments, the distributed drive system 600 may comprise one or more fixed magnets 620.

In some aspects, the coils 610 and the magnets 620 may reside in different portions of a centrifuge 640. In some embodiments, the coils 610 and the magnets 620 may be separated at a predetermined alterable distance to provide for increased conductive efficiency when activating the coils 610 to generate an alternating magnetic field. In some implementations, the coils 610 may remain stationary to facilitate motion in the portion of the centrifuge 640 that comprises the magnets 620.

As an example, the coils 610 may reside in the central column of a centrifuge 640. Upon activation, the coils 610 may induce rotational motion in the magnets 620 that are embedded in the rotational portion of the centrifuge 640 that encircles the central column. Due to the motion induction via magnetism, the centrifuge 640 may rotate with reduced friction, without the limiting factors of gear ratios and other mechanical components.

Figure 7A:
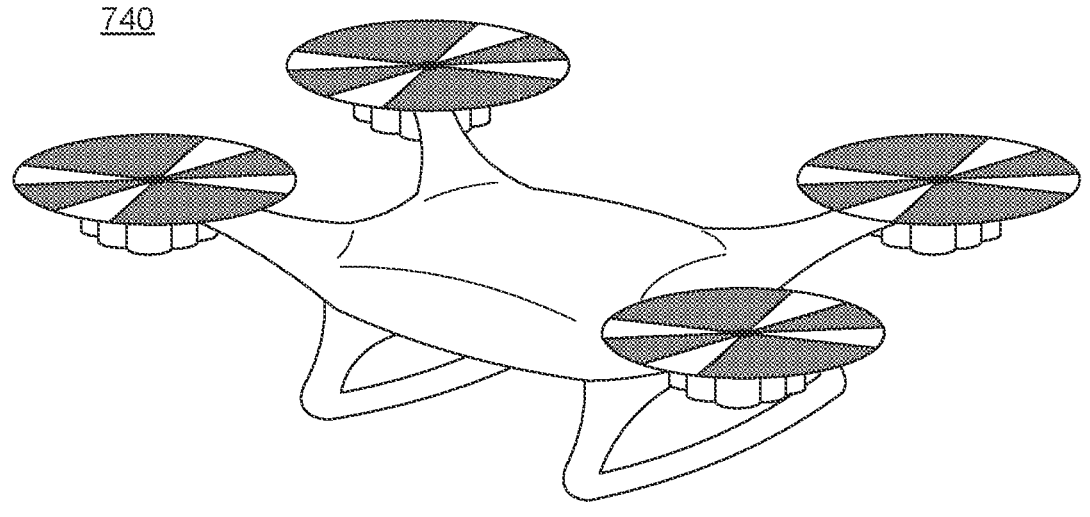
FIG. 7A illustrates an exemplary application of an exemplary distributed drive system, according to some embodiments in the disclosure.
Figure 7B:
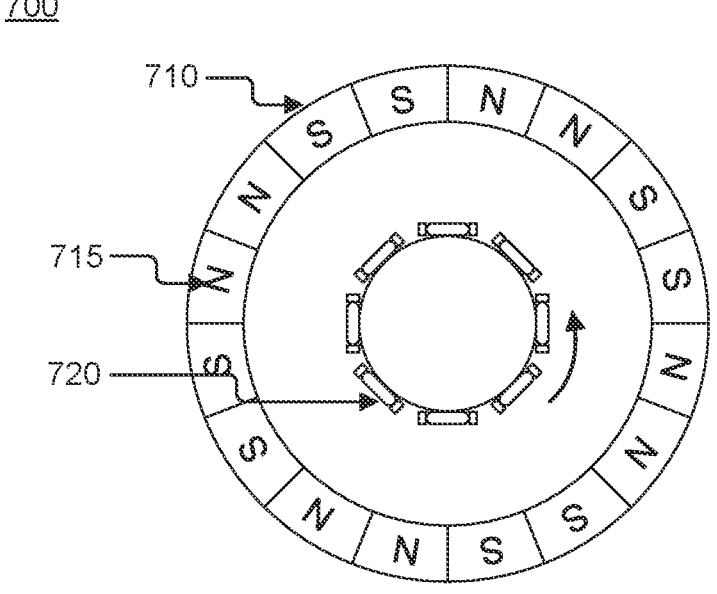
FIG. 7B illustrates an exemplary distributed drive system, according to some embodiments in the disclosure.

Referring now to FIGS. 7A-B, an exemplary distributed drive system 700 and an exemplary application thereof are illustrated. In some embodiments, the distributed drive system 700 may comprise at least one coil 710. In some implementations, the distributed drive system 700 may comprise a plurality of coils 710. In some aspects, each of the coils 710 may comprise one or more polarities 715. In some embodiments, the distributed drive system 700 may comprise one or more fixed magnets 720.

In some aspects, a drone 740 may comprise a plurality of distributed drive systems 700. In some embodiments, a generated magnetic field may induce rotation in one or more smaller components of the drone 740, thereby reducing the size of the required magnetic field needed to induce rotation in the components and allowing simultaneous enablement of a plurality of distributed drive systems 700.

In some aspects, the coils 710 and the magnets 720 may reside in different portions of the drone 740. In some embodiments, the coils 710 and the magnets 720 may be separated at a predetermined alterable distance to provide for increased conductive efficiency when activating the coils 710 to generate the magnetic field(s). In some implementations, the coils 710 may remain stationary to facilitate motion in the portion(s) of the drone 740 that comprise the magnets 720.

As an example, the coils 710 may reside in the external rotor housing of a drone 740. Upon activation, the coils 710 may induce rotational motion in the magnets 720 that are embedded in at least one rotational portion of the drone encircled by the rotor housing. Due to the motion induction via magnetism, the drone 740 may function with reduced friction, without the limiting factors of gear ratios and other mechanical components.

Figure 8:
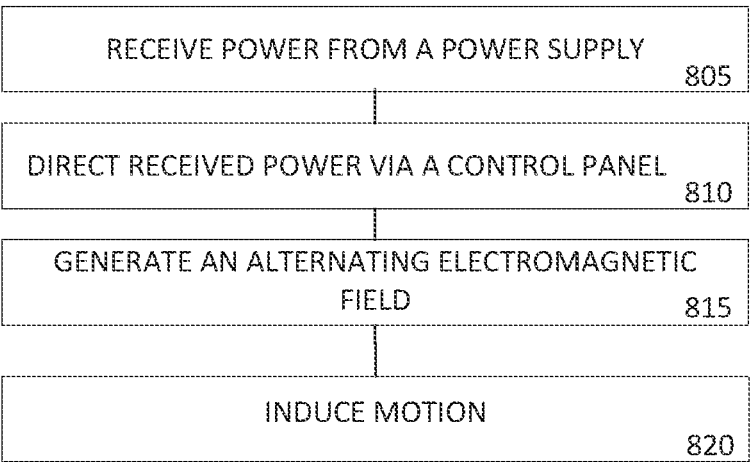
FIG. 8 illustrates exemplary method steps for a distributed drive system, according to some embodiments in the disclosure.

Referring now to FIG. 8, exemplary method steps for a distributed drive system are illustrated. At 805, the distributed drive system may receive power from at least one power supply. At 810, the distributed drive system may direct the received power from the at least one power supply, wherein the received power is directed to two or more coils via at least one control panel, wherein each of the two or more coils comprise two or more polarities.

At 815, the distributed drive system may generate an alternating electromagnetic field, wherein the two or more coils are activated in a predetermined alternating sequence to generate the alternating electromagnetic field from the power received from the control panel. In some embodiments, at 820, the distributed drive system may induce motion, wherein the induction of motion comprises an interaction between the alternating electromagnetic field and at least one magnet, wherein the at least one magnet comprises two or more polarities. In some aspects, the induced motion may be rotational or translational. In some implementations, induced rotational motion may further induce translational motion, such as, by way of example and not limitation, one or more wheels rotating to move a vehicle in one or more directions. In some embodiments, translational motion may be achieved when a directional force is applied to at least one tread, wherein the directional force is generated from the interaction between the alternating electromagnetic field and at least one magnet associated with the at least one tread, wherein the at least one magnet comprises two or more polarities

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A distributed drive system, the distributed drive system comprising:
  at least one power supply, wherein the at least one power supply provides power to the distributed drive system;
  a control panel, wherein the control panel regulates power received from the at least one power supply by distributing power at predetermined intervals;
  two or more coils, wherein the two or more coils may receive power from the control panel to generate an electromagnetic field;

two or more magnets, wherein the two or more magnets are configured to interact with the generated electromagnetic field, wherein the two or more magnets comprise two or more polarities; and at least one tread, wherein the at least one tread receives a directional force resultant of an interaction between the two or more magnets and the generated electromagnetic field.

2. The distributed drive system of claim 1, wherein the two or more polarities comprise alternating polarities.

3. The distributed drive system of claim 1, wherein the at least one tread at least partially comprises the two or more magnets.

4. The distributed drive system of claim 1, wherein the at least one tread at least partially comprises the two or more coils.

5. The distributed drive system of claim 1, wherein the directional force induces a rotational motion.

6. The distributed drive system of claim 1, wherein a distance between the two or more coils and the two or more magnets is alterable.

7. The distributed drive system of claim 6, wherein the distance between the two or more coils and the two or more magnets alters the force of the electromagnetic field on the two or more magnets.

8. The distributed drive system of claim 1, wherein the two or more coils are external from the at least one tread.

9. The distributed drive system of claim 1, wherein the two or more coils activate in a predetermined sequence.

10. The distributed drive system of claim 9, wherein the predetermined sequence activates the two or more coils in a linear order.

11. The distributed drive system of claim 9, wherein the predetermined sequence comprises two or more voltage phase sequences.

12. The distributed drive system of claim 1, wherein the distributive drive system is completely enclosed.

13. A method for a distributive drive system, the method comprising:
  receiving power from at least one power supply;
  directing the received power from the at least one power supply, wherein the received power is directed to two or more coils via a control panel, wherein each of the two or more coils comprise two or more polarities;
  generating an alternating electromagnetic field, wherein the two or more coils are activated in a predetermined alternating sequence to generate the alternating electromagnetic field from the received power from the control panel; and
  inducing motion, wherein the induction of motion comprises an interaction between the alternating electromagnetic field and two or more magnets.

14. The method of claim 13, wherein the two or more coils are at least partially contained within at least one tread.

15. The method of claim 13, wherein the two or more magnets are at least partially contained within at least one tread.

16. The method of claim 13, wherein the two or more magnets are fixed to a movable element.

17. The method of claim 13, wherein the two or more magnets are encircled by the two or more coils.

18. The method of claim 13, wherein the two or more coils are encircled by the two or more magnets.

19. The method of claim 13, wherein the induced motion comprises rotational motion.

20. The method of claim 19, wherein the induced motion comprises translational motion.

* * * * *